Dec. 28, 1937.  G. B. GALLASCH  2,103,525
MICROSCOPE
Filed June 27, 1935

GEORGE B. GALLASCH
INVENTOR
BY
ATTORNEYS

Patented Dec. 28, 1937

2,103,525

UNITED STATES PATENT OFFICE 2,103,525

MICROSCOPE

George B. Gallasch, Rochester, N. Y., assignor to Bausch & Lomb Optical Company, Rochester, N. Y., a corporation of New York Application June 27, 1935, Serial No. 28,682

7 Claims. (Cl. 88—39)

The present invention relates to microscopes and more particularly to binocular microscopes of variable power.

One of the objects of the present invention is to provide a simple, practical and efficient means for varying the power of a binocular microscope. Another object is to provide a binocular microscope having a multiple objective carrier movable in an arcuate path. A further object is to provide a binocular microscope having a multiple objective carrier secured thereto in dust-proof relation. These and other objects and advantages reside in certain novel features of construction, arrangement and combination of parts as will hereinafter be more fully set forth and pointed out in the appended claims.

Referring to the drawing.

Figure 1:
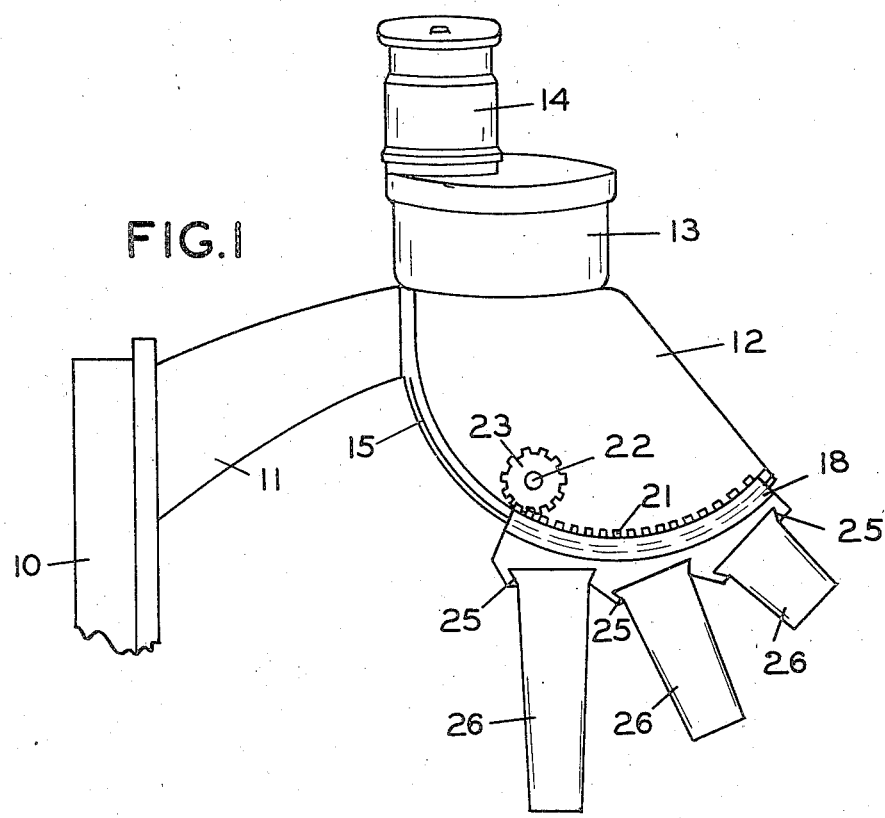
Fig. 1 is a side elevation of a microscope embodying my invention.
Figure 2:
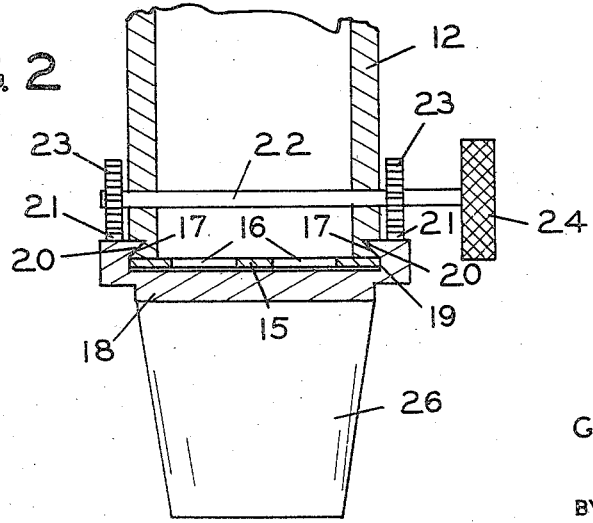
Fig. 2 is a fragmentary vertical section showing the objective carrier mounting.

One embodiment of my invention is illustrated in the drawing wherein 10 indicates a vertical slide upon which is mounted an arm 11 carrying the body member 12. Mounted upon the body member 12 are prism boxes 13 carrying oculars 14. The prism systems may be of any suitable form such as that shown in Patent 1,225,167 issued May 8, 1917 to W. L. Patterson et al.

The lower end of the body member 12 has an arcuate cylindrical form and is closed by a wall 15 which is apertured at 16 to permit the passage of light to the prism boxes 13. On each side of the body member 12, a groove 17 is formed, which extends parallel and closely adjacent to the arcuate wall 15. The multiple objective carrier 18 has a recess 19 which is slightly wider than the body member 12. A tongue 20 on each side of the recess 19 cooperates with the adjacent groove 17 to slidably secure the objective carrier 18 to the body member 12.

In the embodiment shown, the objective carrier 18 is provided with rack teeth 21 on each side of the recess 19. A shaft 22 is rotatably mounted in the body member 12 and carries a pinion 23 for engaging each set of rack teeth 21, and a knurled knob 24 by which the shaft may be turned. The clearance between the wall 15 and the top of the objective carrier 18 is very slight so that dust is substantially excluded from the top of the objective carrier.

The lower end of the objective carrier 18 is provided with a plurality of lateral dovetail grooves 25 in which a plurality of objectives 26 are detachably secured. These objectives 26 are interchangeable and may take any convenient form. One suitable form is that disclosed in the application of George B. Gallasch and Henry F. Kurtz, Serial No. 750,171 filed October 26, 1934.

From the foregoing it will be apparent that I am able to attain the objects of my invention and provide a binocular microscope having simple, practical and efficient means for changing the power thereof. Various modifications can, of course, be made without departing from the spirit of my invention or the scope of the appended claims.

I claim:

1. In a microscope, a body member having an arcuately curved lower wall, a groove in each side of said member substantially parallel to said wall, a multiple objective carrier, a recess in said carrier for receiving the lower end of said member, a tongue on each side of said recess for engaging the adjacent groove on said member to slidably secure said carrier to said member, teeth on said carrier, a gear rotatably mounted on said member for engaging the teeth on said carrier, and means for rotating said gear.

2. In a microscope, a body member having an arcuately curved lower wall, a groove in each side of said member substantially parallel to said wall, a multiple objective carrier, a recess in said carrier for receiving the lower end of said member, a tongue on each side of said recess for engaging the adjacent groove on said member to slidably secure said carrier to said member, teeth on said carrier, a shaft rotatably journalled in said member, a gear fixed on said shaft for engaging the teeth on said carrier, and a knob for rotating said shaft.

3. In a microscope, a body member having two spaced parallel side walls, a cylindrical arcuately curved bottom wall extending between said side walls, a groove on the outer side of each side wall adjacent and parallel to said bottom wall, a multiple objective carrier having two parallel upstanding projections spaced apart a distance greater than the spacing of said side walls, an inwardly extending tongue on each projection so formed as to engage a groove in one of said side walls, and means for sliding said carrier on said member.

4. In a microscope, a body member having two spaced parallel side walls, a cylindrical arcuately curved bottom wall extending between said side walls, a groove on the outer side of each side wall adjacent and parallel to said bottom wall, a multiple objective carrier having two parallel upstanding projections spaced apart a distance greater than the spacing of said side walls, an inwardly extending tongue on each projection so formed as to engage a groove in one of said side walls, and means for sliding said carrier on said member, said means comprising teeth on said carrier, a gear rotatably mounted on said member and engaging said teeth and means for rotating said gear.

5. In a microscope, a body member having a cylindrical, arcuately curved lower wall with a light opening therein, a cylindrical, arcuate track on said body member adjacent to and concentric with said wall, an objective carrier, means for securing a plurality of objectives on said carrier, means for slidably securing said objective carrier on said track so that the objective carrier moves in an arcuate path parallel to said wall and means for moving said objective carrier along said track to selectively position any objective before said opening.

6. In a microscope, a body member having a cylindrical, arcuately curved lower wall with a light opening therein, a cylindrical, arcuate track on said body member adjacent to and concentric with said wall, an objective carrier, means for securing a plurality of objectives on said carrier, means for slidably securing said objective carrier on said track so that the objective carrier moves in an arcuate path parallel to said wall, means for moving said objective carrier along said track to selectively position any objective before said opening, and means for maintaining a dust-proof connection between said carrier and said wall.

7. In a microscope, a body member having an arcuately curved lower wall, a groove on each side of said member substantially parallel to said wall, a multiple objective carrier, a recess in said carrier for receiving the lower end of said member, a tongue on each side of said recess for engaging the adjacent groove on said member to slidably secure said carrier to said member, and means for sliding said carrier relative to said body member.

GEORGE B. GALLASCH.